No. 769,455. PATENTED SEPT. 6, 1904.
J. D. ARTZ.
VEHICLE BODY.
APPLICATION FILED APR. 15, 1904.
NO MODEL.
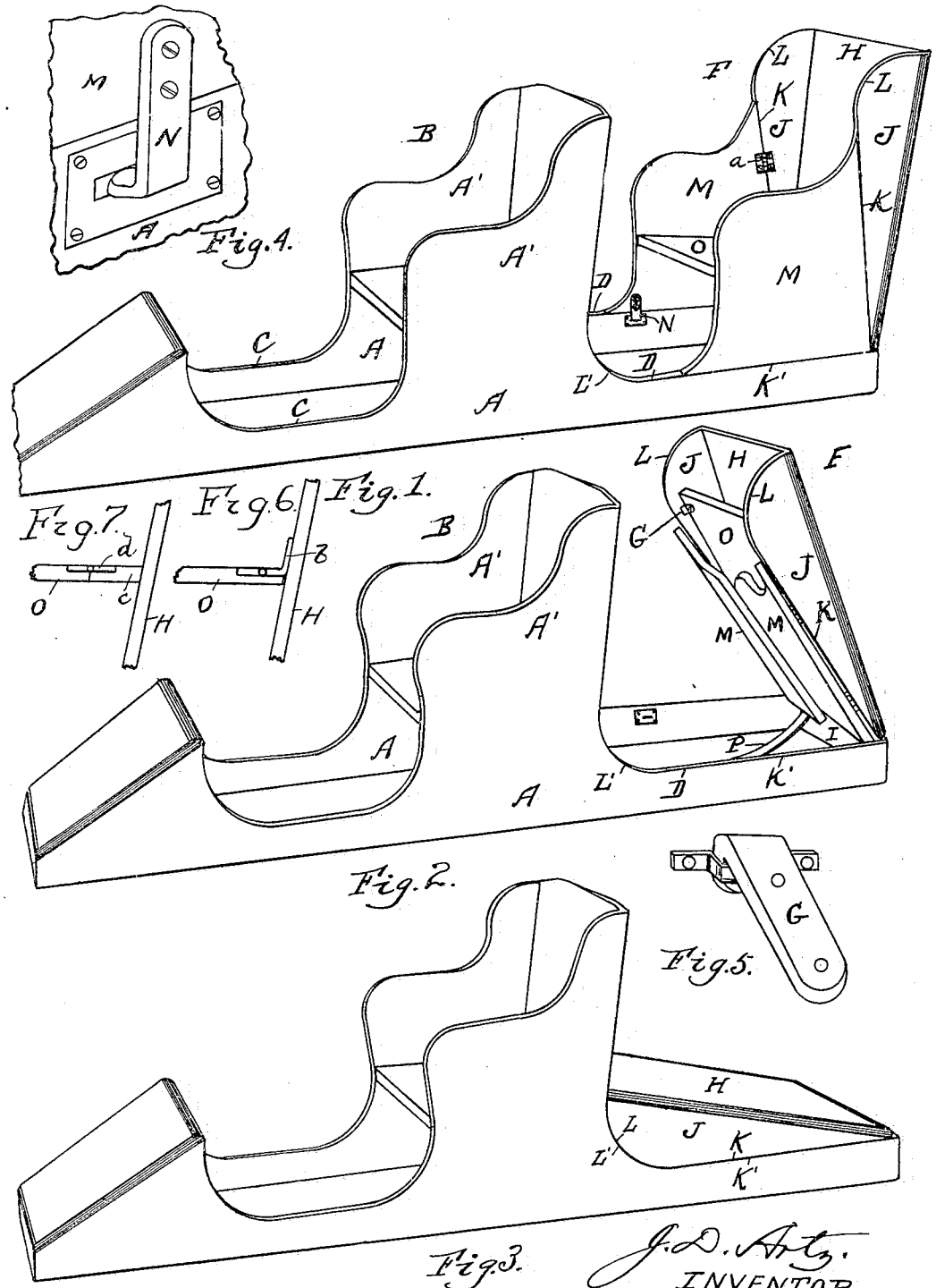
WITNESSES.
J. Fred Hemberger
C. M. Theobald
J. D. Artz
INVENTOR.
By R. J. McCarty
his ATTORNEY.

No. 769,455.
Patented September 6, 1904.

UNITED STATES PATENT OFFICE.

JOHN DUDLEY ARTZ, OF DAYTON, OHIO.

VEHICLE-BODY.

SPECIFICATION forming part of Letters Patent No. 769,455, dated September 6, 1904.

Application filed April 15, 1904. Serial No. 203,255. (No model.)

*To all whom it may concern:*

Be it known that I, JOHN DUDLEY ARTZ, a citizen of the United States, residing at Dayton, in the county of Montgomery and State of Ohio, have invented certain new and useful Improvements in Vehicle-Bodies; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in vehicle-bodies, with special reference to a folding seat, and is especially designed for motor-vehicles.

The object of the invention is to provide a vehicle-body which may be converted from a single to a double seat vehicle, and vice versa, and at the same time the symmetrical appearance of the vehicle-body either as a single-seat or as a double-seat vehicle will be preserved.

A further object of the invention is to provide a folding seat which is easily manipulated and does not impede the entrance to or departure from the vehicle when in either position—namely, an operative position or a folded position—all as will hereinafter be more fully described.

Preceding a detail description of the invention reference is made to the accompanying drawings, of which—

Figure 1 is a perspective view showing the vehicle converted into a two-seated vehicle. Fig. 2 is a similar view showing the rear folding seat in a position to be lowered in converting the vehicle into a single-seated conveyance. Fig. 3 is a similar view showing the vehicle converted into a single-seated conveyance. Fig. 4 is an enlarged detail of one of the hooks or devices of the folding side panels. Fig. 5 is an enlarged detail of one of the cleat-hooks which support the folding seat on the hinged side panels. Figs. 6 and 7 are detail views showing the connection of the rear folding seat with the back.

In the specification similar reference characters indicate corresponding parts.

The sides A of the vehicle-body extend upwardly at A' to form the inclosing side panels of the stationary seat B. The portion of the vehicle-body between the side extensions A' and the front end are low cut, as at C, in the usual manner, in order that the occupant or occupants of the front seat may easily get in and out of the vehicle. This feature of having the sides cut low is utilized in the rear of the stationary seat at D in connection with the rear folding seat F in order that equal facility may be afforded for entering and leaving said folding seat. In other words, the folding seat is as easy of ingress and egress as the stationary seat B. With this advantage in view the body sides A in the rear of the stationary seat B are uniformly low cut to correspond with the low cut in the forward portion of the body, and there is thus preserved a symmetrical design for the side panels of the body.

The rear or folding seat as a whole consists of a back panel H, which is suitably hinged at the rear of the body, said back panel H being suitably upholstered to provide the usual cushion.

J designates side panel extensions which extend from the back panel H and partially inclose the sides of the folding seat. These panels J are rigidly secured to the back panel H and have their inner edges K tapered upwardly and outwardly from the lower ends, so that said panels partake of triangular forms, terminating in rounded ends L. The edges K and L form matching surfaces for the vehicle-body when the various parts comprising the folding seat are lowered, as in Fig. 3. For example, when the seat is folded the edges K and L meet the edges K' of the vehicle-body and the rounded ends L of the panels J meet the rounded surfaces L' in the rear of the side panels A', and thus form a neat joint between the folding seat and the portion of the vehicle-body in the rear of the stationary seat.

M designates hinged or folding side panels of the folding seat. These panels are connected by suitable hinges *a* to the inner sides of the panels J, so as to fold inwardly, and when so folded the edges K of said panels J are left free to meet and engage the edges K' of the body, as hereinbefore stated. The folding side panels M are suitably curved to symmetrically join the upper edges of the panels J and the edges of the body sides immediately in the rear of the stationary seat B, and thus reproduce an outline of the front-seat panels A'. Suitable stops N are placed on the lower inner sides of the folding side panels M to prevent them from moving outwardly or upwardly when in an operative position.

The folding seat O proper may be hinged at its rearward edge directly to the back H by means of angular hinges $b$, or a cleat $c$ may be secured to said back and the folding seat O connected with said cleat by hinges $d$. Any other suitable connection may be provided for the folding seat O, keeping in mind the necessity of its folding toward the back. The seat O is thereby enabled to fold upwardly against said back panel H when it is desired to place said seat out of a serviceable position. When said seat is lowered to its horizontal or serviceable position, it rests upon suitable cleats on the inner sides of the folding panels M and is locked to said cleats by hooks G. In placing the folding seat out of an operative position the seat proper is raised on its hinges against the back. The hinged side panels M are then folded inwardly one upon the other and the entire folding parts are lowered, as in Fig. 3.

P designates a substantial flexible connection fastened to the floor of the vehicle and to the bottom of the folding seat. This device holds said folding seat from tilting rearwardly when it is raised and before the side panels M are locked in place. Other means may, however, be provided for holding the seat from backward movement on its hinges.

The meeting edges between the panels J and the vehicle-body may be cushioned in order to deaden any possible noise due to the moving vehicle.

Having described my invention, I claim—

1. A convertible seat for vehicle-bodies, comprising a back panel hinged to a rearward portion of the vehicle-body, side panel extensions rigidly projecting from said back panel, folding panels hinged to said side extension-panels, and a seat-panel hinged to the back panel and folding thereagainst.

2. A convertible seat for vehicle-bodies, comprising a back hinged to the rearward portion of the vehicle-body, side panel extensions projecting from said back, folding side panels hinged to said side extension-panels, and a seat.

In testimony whereof I affix my signature in presence of two witnesses.

JOHN DUDLEY ARTZ.

Witnesses:
R. J. McCarty,
C. M. Theobald.